Patented July 30, 1929.

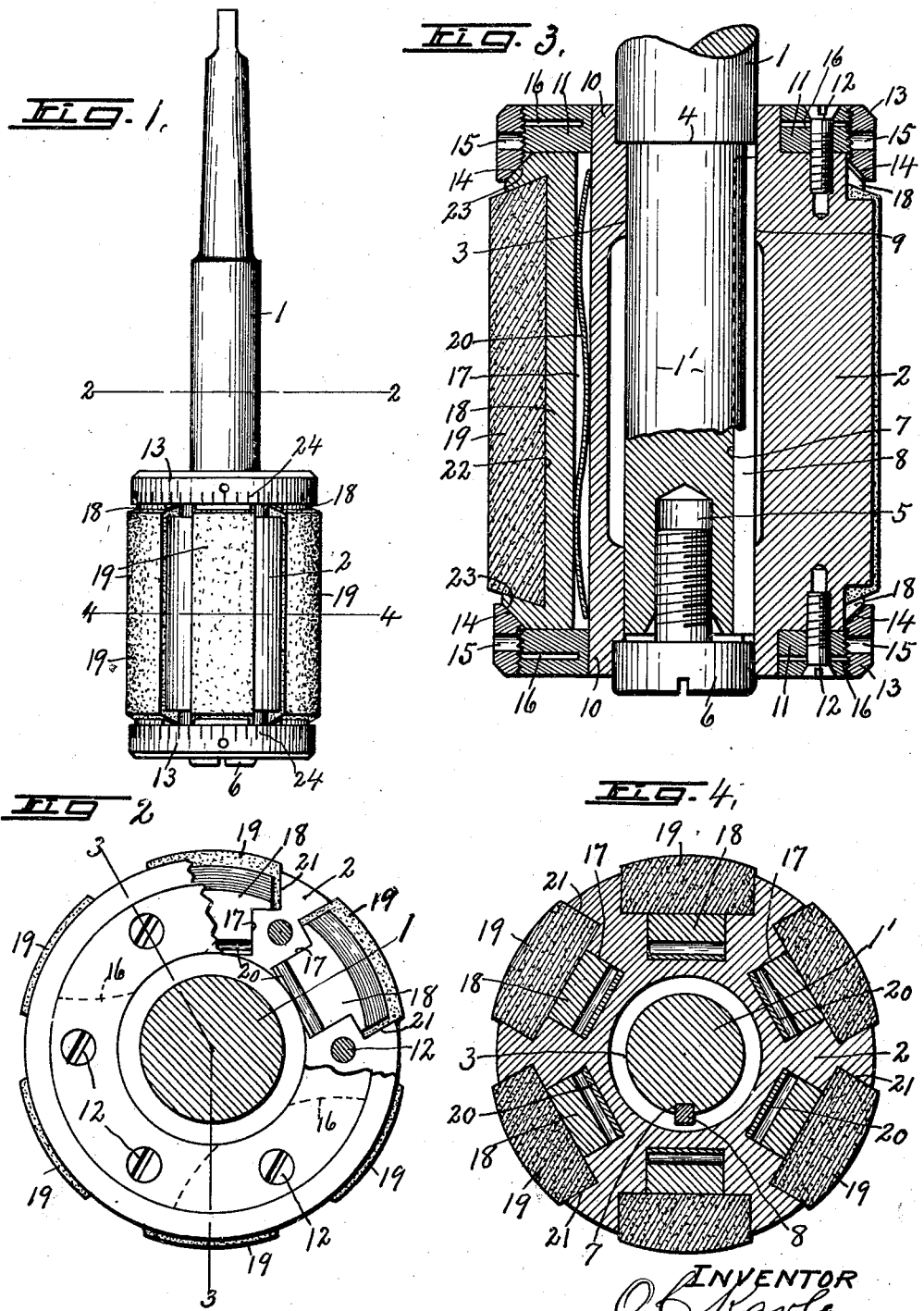

1,722,301

UNITED STATES PATENT OFFICE.

OSCAR C. KAVLE, OF SYRACUSE, NEW YORK.

CYLINDER-GRINDING LAP.

Application filed January 3, 1925. Serial No. 347.

This invention relates to a grinding lap for truing, sizing and smoothing the cylindrical bores of engine cylinders and other objects having circular openings in which all parts of the walls thereof are required to be exactly concentric with a common center or axis.

The device is particularly useful in grinding the cylinders of internal combustion engines, the object being to provide a simple, practical and efficient tool, capable of being easily and quickly placed in the chuck of a drill press, lathe or other suitable machine, and adjusted to produce a smooth, circular bore of the desired size, concentric with the axis of rotation of the tool holder.

Another object is to provide the tool with a plurality of abrasive segments, arranged in uniformly spaced relation circumferentially about the axis of rotation and also to provide means whereby those segments may be adjustably set to grind cylindrical bores of different radii.

A further object is to provide individual holders for the several abrasive segments and to yieldingly support said holders in the tool in such manner as to exert outward radial pressure thereon until limited by the adjustable stops which control the diameter of the bore.

A still further object is to provide means whereby the carrier for the abrasive holders may be easily and quickly removed and replaced upon and from a suitable supporting spindle.

One of the specific objects is to provide adjustable annular stops for limiting the outward movement of the abrasive holders and thereby to assure accurate cylindrical finish of the walls of the bore.

Other objects and uses relating to specific parts of the tool will be brought out in the following description.

In the drawings:

Figure 1 is a side elevation of a grinding tool or lap embodying the various features of my invention.

Figure 2 is an enlarged, transverse horizontal sectional view taken on line 2—2, Figure 1.

Figure 3 is a longitudinal sectional view taken in the plane of line 3—3, Figure 2.

Figure 4 is an enlarged transverse sectional view taken on line 4—4, Figure 1.

As illustrated the grinding tool proper, forming the subject matter of this invention, is mounted upon a suitable shaft or spindle —1— which in turn is adapted to be secured in the chuck of a drill press, lathe or other suitable machine to be rotated thereby, said tool comprising a more or less cylindrical head —2— having a central lengthwise opening —3— for receiving a reduced portion —1'— of the shaft —1— having a shoulder —4— against which one end of the head —2— is adapted to be clamped.

The other or lower end of the reduced portion —1'— of the spindle is provided with a threaded socket —5— for receiving an adjustable shoulder or clamping screw —6— which engages the adjacent end of the head —2— for firmly clamping said head upon the spindle to rotate therewith.

The reduced portion —1'— of the spindle is also provided with a keyway —7— for receiving a key —8— which also enters a keyway —9— in the head —2— for splining the head to the spindle to rotate therewith.

The key —8— and its keyways —7— and —9— extend the major portions of the lengths of the head —2— and reduced portion —1'— of the spindle so that by removing the screw —6— the head and parts carried thereby may be easily and quickly removed from the spindle by endwise displacement therefrom.

The opposite ends of the head —2— are provided with reduced annular bearings —10— for receiving and supporting a pair of collars —11— which are clamped in place by screws —12— for holding them in fixed relation to the head, the collars being of substantially the same axial length as the reduced portions —10— and abutting against the adjacent ends of the larger portions of the head when clamped in place by the axially extending screws —12—.

The collars —11— are threaded externally for receiving internally threaded nuts —13— which are adjustably axially toward and from each other by a turning movement upon the collars —11— and are provided with conical annular bearings —14— facing each other for a purpose presently described. These nuts —13— may be turned upon the collars —11— by any suitable means and for this purpose are provided with radial openings —15— adapted to be engaged by a spanner wrench or equivalent tool for turning the same.

The collars —11— are provided with diametrically opposite slots —16— registering with adjacent screws —12— and of sufficient area to permit the outer end walls of the slots to yield slightly under the tightening of the adjacent screws for the purpose of frictionally binding the threads on the outer end walls of the slot against the adjacent threads of the nuts —13— for holding the latter in their adjusted positions against accidental turning.

The head —2— is provided with a series of radial grooves or channels —17— extending lengthwise from end to end of the larger portions of the head between the reduced bearings —10— for receiving a corresponding number of abrasive holders or bars —18— and abrasive segments or laps —19— together with an equal number of bow springs —20— which are interposed between the bottoms of the grooves —17— and adjacent faces of the holders —18— and are normally tensioned to exert outward pressure upon said holders.

When the holders —18— are placed in operative position they are held against endwise movement by the engagement of their opposite end faces with the inner faces of the collars —11— but are free to slide radially in their respective grooves —19— under the tension of the springs —20— or by the adjustment of the nuts —13—.

The abrasive segments —19— are somewhat wider circumferentially than their respective holders —18— so as to project beyond the opposite longitudinal edges thereof and are seated in grooves —21— of corresponding width in the periphery of head —2— to form enlarged continuations of the adjacent grooves —17— and in which the abrasive elements —19— are radially movable with their respective holders —18—.

Each abrasive segment —19— is preferably dove-tailed longitudinally and seated in corresponding longitudinally dove-tailed recesses —22— in the adjacent holder —18— to hold those parts against relative endwise or radial movement, the recesses —22— being preferably open at both sides of the holder —18— to permit the abrasive element to be inserted into and withdrawn from said holder except that when the abrasive element is mounted in the recess it may be additionally held in place against lateral movement through the open sides thereof by cementing its inner face to the adjacent face of the holder, both of said faces being preferably flat throughout their areas to afford a firm bearing for the abrasive element.

The opposite ends of each holder —18— are provided with outwardly converging flanges which are beveled at —23— to correspond to the conical bearing faces —14— and to cause the holders —18— with the abrasive elements —19— thereon to be forced inwardly toward the center of the spindle —1— against the action of their respective springs —20— when the nuts —13— are screwed inwardly or toward each other. The slots —17— and —21— and consequently the abrasive holders —18— and segments —19— are arranged in uniformly spaced relation circumferentially around the axis of the head —2— and spindle —1— while the peripheries of the abrasive elements —19— are circular and concentric with said axis and normally project beyond the periphery of the head —2— so as to act directly upon the walls of the bore which is being trued or reground without interference of the periphery of said head with the walls of the bore, it being understood that the peripheries of the abrasive segments also project slightly beyond the peripheries of the nuts —13— for the same purpose.

In Figure 4 the abrasive segments —19— are shown as seated against the bottoms of their respective grooves —21— and therefore are set at the limits of their inward movements which may be termed the zero position thereof, it is evident that the grooves —21— may be made of slightly greater radial depth to allow further inward adjustment of the segments —19— without departing from the spirit of this invention.

The outer longitudinal surfaces of the segments —19— are preferably straight from end to end and when properly adjusted for truing cylindrical bores are parallel with the axis of the spindle —1— and are maintained in this parallel relation by equal adjustments of both of the nuts —13— which are provided with peripheral graduations —24— for this purpose, that is, to assure a corresponding adjustment of both ends of the segments, said graduations serving also to determine the maximum radius of the finished bore.

*Operation.*—In truing or grinding the bore of a cylinder the abrasive holders —18— with the segments —19— thereon are adjusted to the maximum radius required for the bore by simply adjusting the nuts —13— after which the head with the abrasive elements thereon is inserted gradually into the bore thereby causing more or less inward compression of the holders and their segments against the action of their respective springs —20— and as the walls of the bore are ground away by rotary and axial movement of the lap therein the holders with the segments thereon are gradually pressed outwardly by their springs —20— until limited by the engagement of the beveled shoulders —23— on the ends of the holders with the conical bearings —14— on the nuts —13—, the grinding being continued until all of the holders have reached the limits of their outward movements at which time the bore will be brought to the desired concentricity or equal radius throughout its circumference and length.

Or, if desired, the abrasive elements of the lap and their holders may be previously adjusted to a diameter slightly less than that of the bore and then gradually expanded by the adjustment of the nuts —13— when withdrawn from the work after each trial grinding operation.

It is also evident that a slightly taper bore may be made uniform by adjusting one end of the abrasive holders to a diameter slightly less than that of the opposite end with the assurance that the diameters of both ends and intermediate portions of the bore will be brought to the required diameters by limitations of outward movement of the holders as determined by the adjustment of the nuts —13—.

It will be observed that when the abrasive elements of this lapping device are expanded to the limit of their outward movements as regulated by the adjustment of the nuts —13—, they have substantially the same effect upon the bore as a solid lap by reason of the fact that the springs —20— are relatively stiffer and under considerably higher tension than commonly employed in spring expanded laps and that these relatively stiff springs are used in conjunction with the adjustable limiting stops such as the nuts —13— which positively fixes the diameter of the finished bore while the tension of the springs renders the radial support of the abrasive holders practically rigid when the bore is brought to the desired radius.

What I claim is:

In a cylinder grinding device, the combination of a cylindrical head having reduced ends and radial lengthwise grooves between said reduced ends, peripherally threaded collars removably mounted on said reduced ends, lap-supporting bars movable radially in said grooves and having their opposite ends abutting against said collars and provided with outwardly converging flanges projecting beyond the peripheries of said collars, internally threaded nuts engaging the threaded peripheries of the collars and outer end faces of the flanges, abrasive laps having their opposite ends engaged with the inner faces of the flanges, and means for yieldingly holding the bars in engagement with said flanges.

In witness whereof I have hereunto set my hand this 22nd day of December, 1924.

OSCAR C. KAVLE.